(12) United States Patent
Lagardere et al.

(10) Patent No.: US 7,372,993 B2
(45) Date of Patent: May 13, 2008

(54) GESTURE RECOGNITION

(75) Inventors: Xavier Lagardere, Barcelona (ES);
Andreu Gonzalez, L'Hospitalet de Llobregat (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 684 days.

(21) Appl. No.: 10/895,740

(22) Filed: Jul. 21, 2004

(65) Prior Publication Data

US 2006/0018546 A1    Jan. 26, 2006

(51) Int. Cl.
*G06K 9/18* (2006.01)
(52) U.S. Cl. .................................. 382/186
(58) Field of Classification Search ........ 382/186–189, 382/309–310, 176; 715/530
See application file for complete search history.

(56) References Cited

U.S. PATENT DOCUMENTS

| | | | |
|---|---|---|---|
| 4,727,588 A | 2/1988 | Fox et al. ................ 382/189 |
| 5,231,698 A | 7/1993 | Forcier et al. | |
| 5,333,209 A | 7/1994 | Sinden et al. ............. 382/13 |
| 5,347,295 A | 9/1994 | Agulnick et al. | |
| 5,500,937 A | 3/1996 | Thompson-Rohrlich et al. | |
| 5,687,254 A * | 11/1997 | Poon et al. ............... 382/229 |
| 5,710,831 A | 1/1998 | Beernink et al. .......... 382/187 |
| 5,737,443 A | 4/1998 | Guzik et al. .............. 382/188 |
| 5,784,504 A * | 7/1998 | Anderson et al. ......... 382/309 |
| 5,796,866 A | 8/1998 | Sakurai et al. ............ 382/187 |
| 5,862,251 A | 1/1999 | Al-Karmi et al. ......... 382/186 |
| 5,864,635 A | 1/1999 | Zetts et al. ............... 382/187 |
| 5,889,889 A | 3/1999 | Sinden ..................... 382/187 |
| 5,903,666 A | 5/1999 | Gusik et al. .............. 382/179 |
| 5,946,406 A | 8/1999 | Frink et al. ............... 382/119 |
| 5,956,423 A | 9/1999 | Frink et al. ............... 382/187 |
| 6,054,990 A | 4/2000 | Tran ........................ 345/358 |
| 6,057,845 A * | 5/2000 | Dupouy .................... 715/863 |
| 6,269,187 B1 | 7/2001 | Frink et al. ............... 382/187 |
| 6,282,316 B1 | 8/2001 | Arai ........................ 382/187 |
| 6,401,067 B2 | 6/2002 | Lewis et al. .............. 704/275 |
| 6,504,956 B1 | 1/2003 | Gannage et al. .......... 382/188 |
| 6,580,826 B1 | 6/2003 | Sinden ..................... 382/187 |
| 6,594,390 B2 | 7/2003 | Frink ....................... 382/187 |

FOREIGN PATENT DOCUMENTS

| | | |
|---|---|---|
| EP | 0565872 A | 10/1993 |
| EP | 1376448 A | 1/2004 |

OTHER PUBLICATIONS

Tappert, et al. "The State of the Art in On-Line Handwriting Recognition", IEEE, pp. 787-808, Aug. 1990.*
Smithies, Steve , "Equation entry and editing via handwriting and gesture recognition", *Behaviour and Information Technology*, 20(1), (Jan. 2001),53-67.
Van West, Jeff , "Using Tablet PC: Handwriting Recognition 101", *Windows XP Home Web Site*, http://www.microsoft.com/windowsxp/using/tabletpc/getstarted/vanwest_03may2.8hanrec.mspx, (May 28, 2003), 1-7.
International Search Report for Application No. PCT/US2005/024987. Report issued Jan. 19, 2006.

* cited by examiner

*Primary Examiner*—Daniel Mariam

(57) ABSTRACT

A gesture related to portions of handwritten text is recognized. Furthermore, an action is performed against the portions of the handwritten text. The action is associated with the recognized gesture.

26 Claims, 5 Drawing Sheets

GESTURE RECOGNITION

BACKGROUND

A common problem in data entry systems is processing data corrections (editing). This is particular true for handwriting recognition systems, where some of the signals received for handwritten text may include special symbols which are created by a writer as gestures over or in close proximity to some portions of the handwritten text. The primary problem with this form of correction is that the writer attempted edits (via the special symbols) can overlap some of the handwritten text. This makes it extremely difficult to translate the handwriting text and identify what editing the writer desired by the special symbols.

Conventionally, a writer's gestures, which are used to create special editing symbols, are incorporated as part of the overall handwritten text image. Correspondingly, the special symbols are not separable from the substantive text images before character recognition can be applied. Character recognition translates the text images into machine-readable characters for use in electronic systems and applications (e.g., word processors, spreadsheets, calendars, etc.).

DETAILED DESCRIPTION

Figure 1:
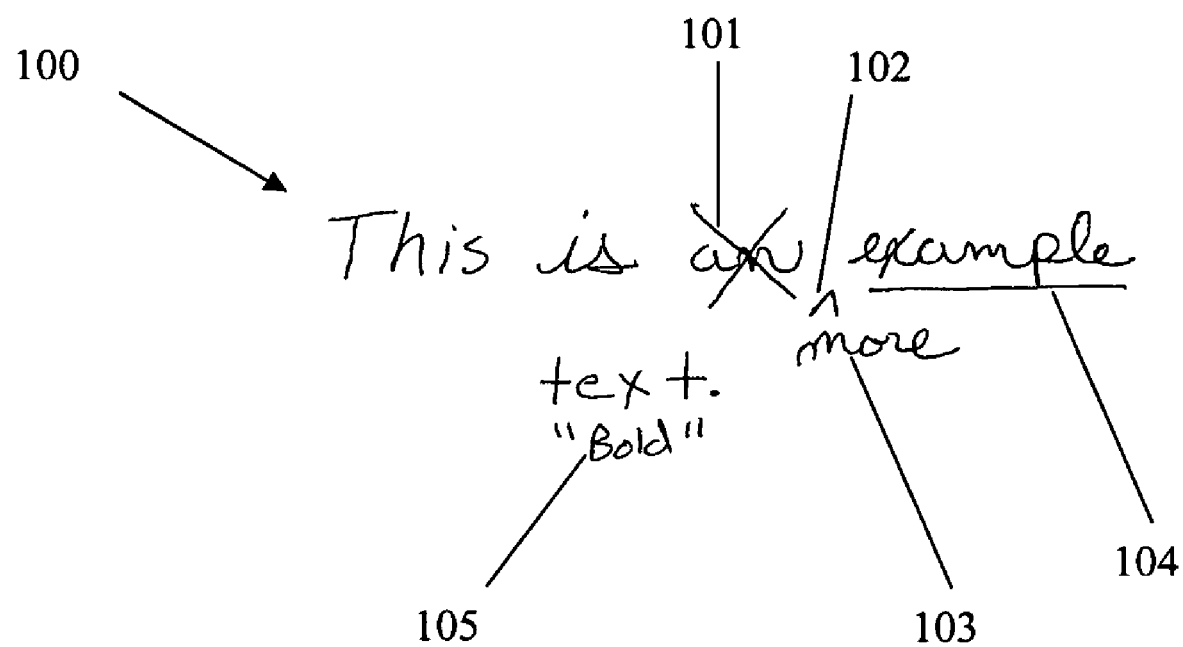
FIG. 1 is a diagram of example handwritten text having gestures recorded thereon as symbols, according to an example embodiment.

FIG. 1 is a diagram of example handwritten text 100 having gestures recorded thereon as symbols, according to an example embodiment. FIG. 1 is presented for purposes of illustration only and is not intended to limit various embodiments of the invention presented herein and below. Accordingly, FIG. 1 provides an example context for various embodiments of the invention, which will be described more fully in FIGS. 2-5.

The example handwritten text 100 can be recorded through a variety of devices or combination of devices in order to capture its image as presented in FIG. 1. Some example devices include digital pens, digital styluses, digital cameras, etc. These input devices may be further interfaced to other processing devices (e.g., computers, Personal Digital Assistants (PDAs), digital tablets, intelligent appliances, phones, etc.) for purposes of translating the handwritten text 100 into machine-readable characters and for subsequent use with other applications.

The example handwritten text 100 includes six identified images of a word, namely: "This," "is," "an," "more" 103, "example," and "text." The handwritten text 100 may be presented in print form as is the word "This," may be presented in cursive as is the word "is." Additionally, any single word may include a combination of printed and cursive text.

In some embodiments, the handwritten text 100 may be an imaged form of machine printed text characters that may or may not include some hand printed or cursive additions integrated within the image. In these embodiments, the handwritten text will initially not include special symbols 101, 102, 104, and 105. That is, these special symbols 101, 102, 104, and 105 are added after the handwritten text in image form is captured in a processing device for processing but before the image is processed by an Intelligent Character Recognition (ICR) engine and/or an Optical Character Recognition (OCR) engine. This may be advantageous when a printed page is scanned into a processing device and the image of that printed page is edited with the special symbols 101, 102, 104, and 105.

The special symbols are captured as gestures from a writer that utilizes an input device (e.g., digital pen, digital stylus, digital camera, etc.). That is, the writer manipulates the input device or is in view of the input device in situations where a digital camera is the input device, and the input device captures the writer's gestures over the previously recorded and captured handwritten text 100. These gestures are recognized as symbols 101, 102, 104, and 105. Gestures are candidate symbols. A symbol 101, 102, 104, or 105 is an indexed and searchable representation of an editing image defined by writers. The symbols 101, 102, 104, and 105 may be writer defined based on the writing style and desires of particular writers. Moreover, each symbol 101, 102, 104, and 105 is associated with one or more actions.

Actions can include pre-defined editing operations, custom writer-defined operations, and other operations such as add comments, etc. In the example handwriting text 100 of FIG. 1, the first symbol 101 is identified as an "X" through the word "an." This may be associated with a pre-defined editing operation that deletes or removes the word "an" from the handwritten text 100. The second symbol "^" 102 is associated with a space (which is part of the handwritten text 100) between the word "is" (since the word "an" was removed) and the word "example." The "^" 102 may indicate that an insertion of another word or string or words is to be inserted at the location of the "^" 102. In the example of FIG. 1 that inserted word is the word "more" 103.

The fourth symbol 104 is an underline of the word "example." This may be associated with an editing action to underline the word "example." The fifth symbol "Bold" 105 is underneath or directly adjacent to the word "text." The "Bold" symbol 105 may be associated with an action that bolds the word "text."

Because the symbols 101, 102, 104, and 105 are writer defined, a variety of additional symbols and symbol syntaxes and semantics can be used. For example, a circled word or series of words or characters may be used to indicate that those words or characters are to be bolded, italicized, etc. As another example, one symbol may be used to indicate that an action is to start and another related symbol used to indicate that an action is to stop. For instance, the word "text" may be surrounded by two symbols a "<BB>" for begin bold and "<EB>" for end bold. Therefore, symbol grammars (defining semantics) and syntaxes are configurable based on the style of a writer.

In addition, some symbols (not shown in FIG. 1) may be used to indicate other actions are to be performed against their associated handwritten text. For example, a writer may wish to add a comment to refresh his/her memory about a specific topic. Additionally, a writer may wish to automatically export some words or numbers from the handwritten text to spreadsheets, electronic mail, etc. once the handwritten text is translated into machine-readable format. Thus, in some embodiments, some symbols can be associated with actions that perform writer-defined operations against their associated handwritten text.

In the descriptions that follow, it will be demonstrated how the handwritten text 100 of FIG. 1 is processed in order to generated a modified version of the handwritten text 100, which produces the sentence: "This is more example text." This transformation occurs before the resulting sentence is processed by an ICR engine and/or an OCR engine.

Figure 2:
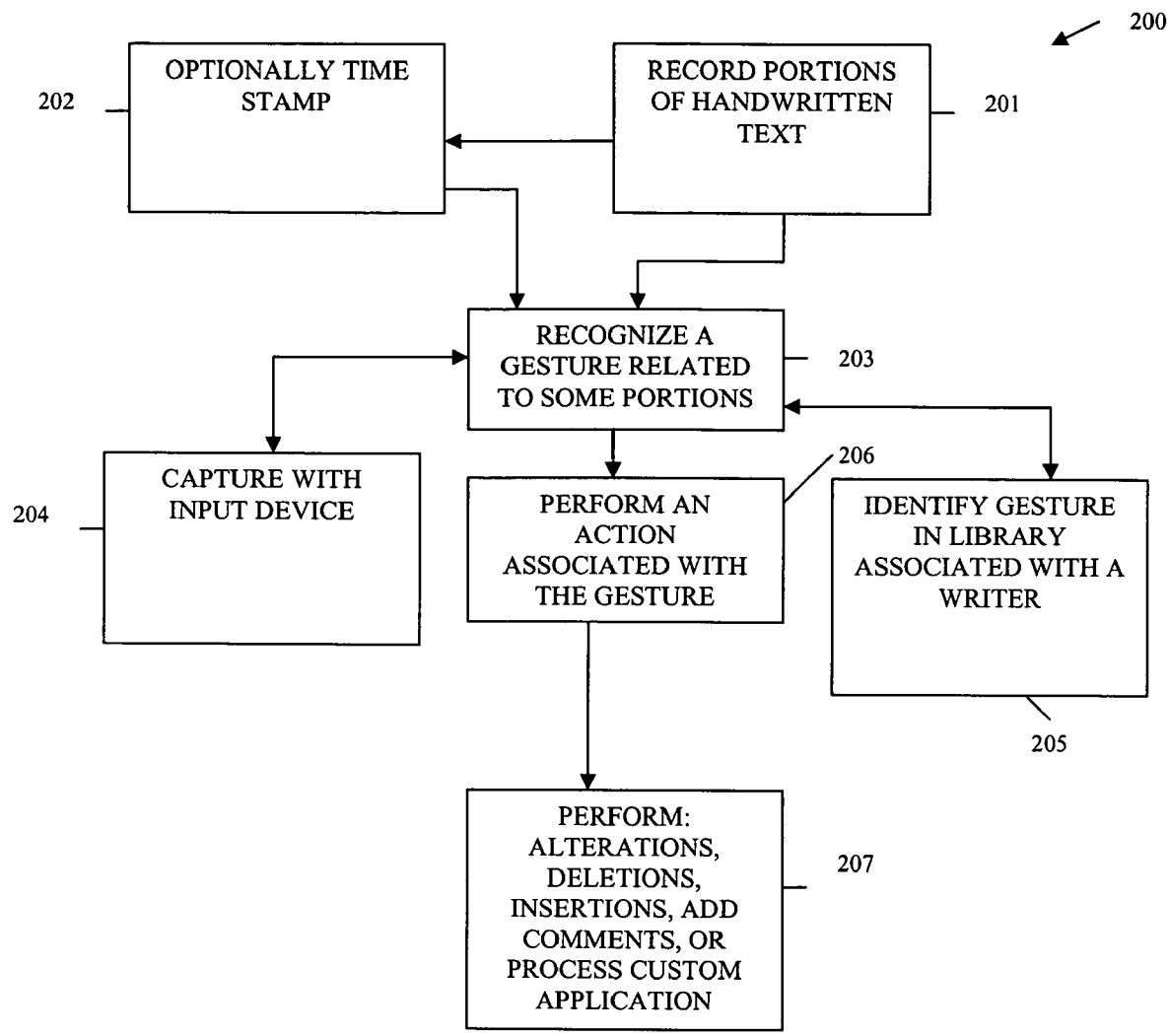
FIG. 2 is a diagram of a method for recognizing gestures, according to an example embodiment.

FIG. 2 is a diagram of one method 200 for recognizing and processing gestures, according to an example embodiment of the invention. The method 200 is implemented in a machine-readable and accessible medium and processes against imaged data associated with handwritten text. The handwritten text can include some portions of machine-printer characters, portions of captured hand printed characters, and/or portions of captured hand cursive characters. The actual text can be any character, punctuation, number, or symbol which a processing device is capable of recognizing. Thus, in some embodiments, some unprintable characters, such as line feeds, etc. may be captured with pre-defined strings present in the handwritten text (e.g., "\LF" for line feed, "\CR" for carriage return, and the like).

At 201, portions of handwritten text are recorded. Recordation can occur in a real time fashion, such as when a writer is using an input device (e.g., digital pen) that is interfaced to the processing device that is executing the method 200. In one embodiment, at 202, the portions of handwritten text are time stamped as they are recorded. These time stamps are maintained as metadata associated with the handwritten text. Moreover, the time stamps permit the method 200 to detect when a gesture is made over or in proximity to a previously recorded portion of the handwritten text. The difference in time allows the method to distinguish between editing gestures and originally recorded handwritten text. This separation permits the method 200 to perform actions associated with the gestures against associated handwritten text before the handwritten text is passed on to an ICR engine and/or OCR engine.

At 203, a gesture from a writer is recognized. The gesture occurs over some portion of the previously recorded handwritten text. Again, at 204, the gesture may be captured through a variety of input devices interfaced to the processing device which is executing the method 200, such as digital pens, digital styluses, digital cameras, and the like. The input device may be directly manipulated by a writer (digital pen, digital stylus, etc.) or may record or track movements of a writer with respect to the handwritten text (digital camera, digital video, etc.). Also, in some embodiments, the writer that manipulates the input device may a different writer than the writer that initially provided the handwritten text. In fact, the handwritten text and the gestures may be recorded and recognized from a variety of different writers.

In one embodiment, at 205, the recognized gesture may be identified as a symbol associated with a library of symbols and may be further identified based on an identification for a writer. That is, the gesture may be translated into an image or other normalized format that is then searched within a library using a writer's user identification as a key. The searching does not have to be an exact match; the matching may be achieved via a substantial comparison. Substantial matching of image data is well-known in the search and imaging arts and any technique may be used to locate a symbol within the library for the recognized gesture. Typically, a substantial match is achieved by representing an image of a gesture as a score or series of features and then detecting potential matches that fall within a predefined range or threshold. In this manner a substantial match occurs rather than an exact match.

At 206, an action is performed against the portions of the handwritten text which is associated with the recognized gesture. A variety of pre-existing or custom actions may be performed at 207. For example, the action may be associated with pre-defined editing operations that alter the appearance of the portions of the handwritten text, such as font changes, color changes, texture changes, effects to bold, italicize, etc. Some editing operations may be used to delete the portions of the handwritten text or to insert other handwritten text in a location indicated by the recognized gesture. In other embodiments, the actions may indicate that a writer-defined comment is to be associated with the portions of the handwritten text having the recognized gesture. In yet other embodiments, the actions may indicate that a writer-identified custom application is to be automatically processed against the portions of the handwritten text having the recognized gesture.

In some embodiments, a single portion of the handwritten text may include multiple recognized gestures. This can be processed by the method 200 through the use of time stamps that record when each of the multiple gestures were recognized. The multiple gestures may compliment one another, such as by performing different actions (e.g., bold and italicize) or the multiple gestures may contradict one another (e.g., bold and do not bold) in which case the last recognized gesture having a later time stamp takes precedence. Alternatively, precedence may be established by custom rules when multiple gestures for the same portion of the handwritten text are detected.

Moreover, in one embodiment, a single action associated with a gesture may be a compound action. This means that a compound action performs a series of operations against its associated handwritten text, such as bold, italic, and capitalization.

In yet other embodiments, the method 200 may be customized to record versions associated with the handwritten text. For example, the original unedited handwritten text may be retained as a first version, and the resulting version associated with the modified handwritten text after performing identified edits retained as a second version. Each version need not be maintained in storage. That is, metadata associated with the edits that take place may be carried or associated with the original handwritten text and used to reconstruct any desired version of the writer.

In still other embodiments, some gestures defined by a writer may be associated with security, such that certain portions of the handwritten text associated with these security gestures prevent certain other viewers or writers from being able to view or edit the handwritten text.

The method 200 processes by maintaining the handwritten text in image form separately from recognized gestures. Essentially, the gestures are metadata about defined portions of the handwritten text. In this manner the gestures may overlay some or all of their associated handwritten text or be interposed within various portions of the handwritten text in adjacent locations. The actions associated with the gestures are performed before the modified handwritten text image is passed to an ICR engine and/or OCR engine. Thus, writers are free to write and edit text in manners and locations that suit their mobile life-styles and suit their personal writing techniques.

The method 200 permits a spatial relationship between handwritten text and metadata (gestures recognized as normalized symbols) representing writer-defined actions (e.g., edits, comments, and/or actions). These relationships may be created via time stamps associated with positional locations of portions of the handwritten text. These relationships may be recorded and made in a real time or batch fashion, assuming the original recorded handwritten text is associated with time stamps for its component pieces (sub images representing pieces of text or characters). It should also be noted that other techniques besides timestamps may be used to uniquely identify component pieces of recorded handwritten text. For example, a unique random number combined with writer identification may be deployed to uniquely identify and associate metadata to pieces or portions of the handwritten text.

The processing of the method 200 is particularly well-suited for digital pen devices and systems, since the processing represents a straightforward, reliable, and cost effective solution to gesture recognition and the actions associated therewith.

Figure 3:
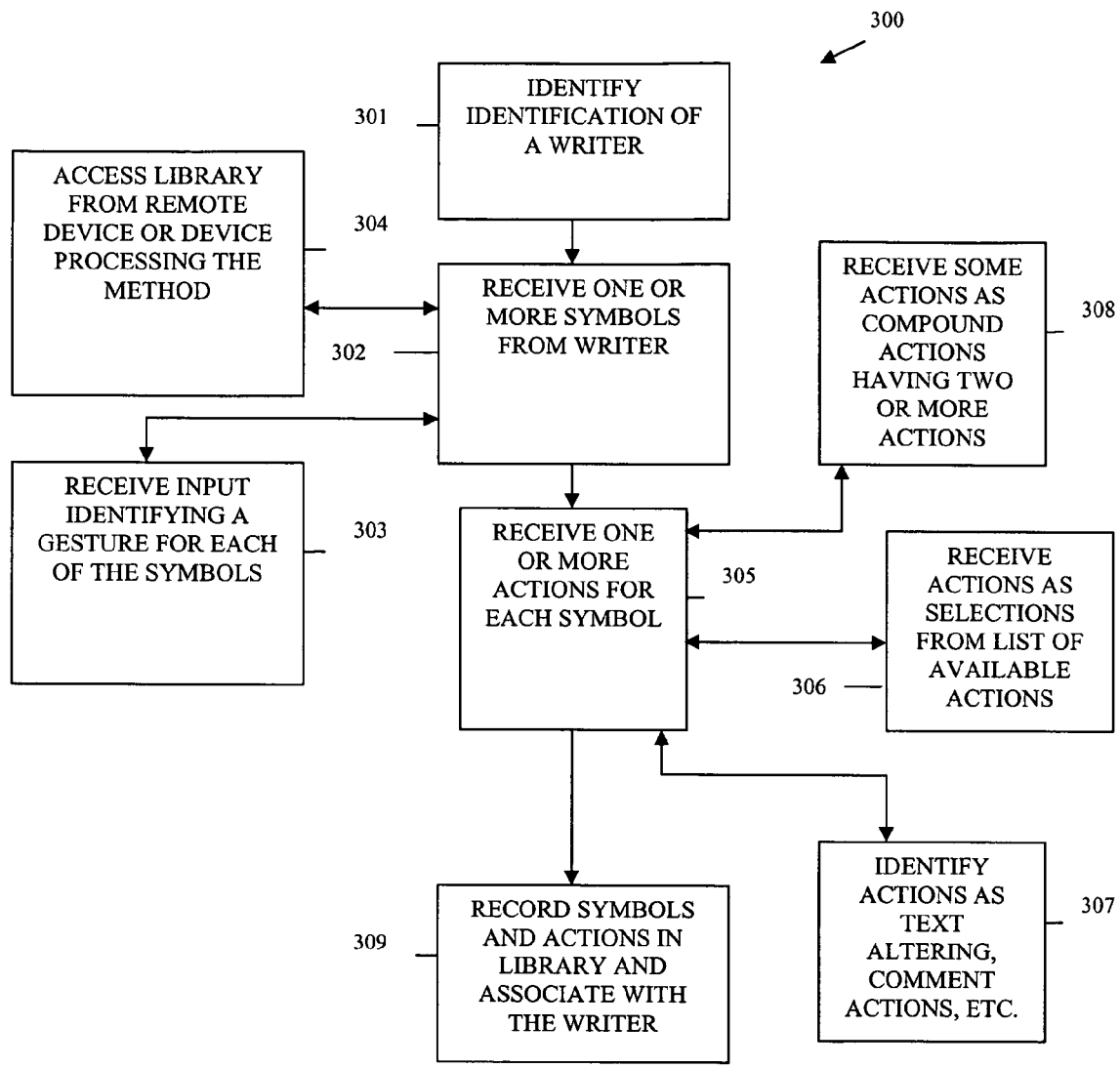
FIG. 3 is a diagram of a method for recording symbols associated with gestures, according to an example embodiment.

FIG. 3 is a diagram of a method 300 for recording symbols associated with gestures, according to an example embodiment. The method 300 is implemented in a machine-accessible and readable medium. In one embodiment, the method 300 compliments the processing of the method 200 of FIG. 2 by providing a toolkit or Application Programming Interface (API) to writers to define and customize their own individual symbols associated with gestures (candidate symbols) that they make while editing handwritten text.

At 301 a writer logs into interfaces associated with the processing of the method 300. A login may occur by manually providing a writer's identification to the interfaces or by applications or hidden files or keys being automatically provided to or acquired by the processing of the method 300 on behalf of a writer. The writer's identification permits the method 300 to identify the writer and properly index and save symbols provided by the writer. The symbols are editing characters, strings, or images supplied and inputted by the writer. In some embodiments, the symbols are provided via an input device, such as a digital pen, digital stylus, digital camera, etc. In other situations, the symbols may be pre-defined and available for the writer to select via a variety of input selection interfaces associated with the processing of the method 300.

Accordingly, at 302, the method 300 receives either manually or via selection a variety of editing symbols desired by a writer identified by the writer's identification. In situations where the writer manually supplies the symbols, these symbols may be received as input, at 303, from the writer as gestures. The gestures are candidate symbols, should similar symbols exist and otherwise the gestures inputted by the writer become newly defined symbols.

In some embodiments, the inputted gestures are translated into mathematical representations or normalized forms, which can be indexed and searched within a data store or library of symbols and keyed against the writer's identification. If the inputted gestures translated into normalized forms are found within the library, then copies of the found symbols are provided and copied to locations of the library associated with the writer's identification. If the inputted gestures translated into normalized forms are not found within the library, then new symbols are created and indexed within locations of the library associated with the writer's identification.

The library of indexed symbols, which represent normalized gestures, may be a database, data store, file, directory, or other storage area that includes interfaces for creating, copying, deleting, searching, and indexing symbol records. The records minimally include a writer's identification, a plurality of normalized gestures provided or selected by the writer and representative of editing symbols for handwritten text, and one or more references or links to actions for each of the symbols. In some cases, the records may also include policies and security data.

In one embodiment, at 304, the library is external or remote from a processing device that executes the method 300. That is, in one embodiment, at 304, the processing of method 300 is interfaced to a network and interfaces with the library via the network. In an alternative embodiment, also at 304, the processing device that executes the method 300 includes within its processing environment the library housing the symbols and their records.

At 305, one or more actions, action references, or action links are received. The writer provides the actions, references, or links and associates them with specific ones of the symbols. The symbols and their respective actions are combined with the writer's identification to create records within the library. In some cases, available or pre-defined editing actions are provided as selections to the writer, such that the writer manually selects desired actions and associates the selected actions with specific ones of the symbols. At 306, these writer selected actions are received by the processing of the method 300. In other cases, the writer provides references or links to custom actions and these references or links are received by the processing of the method. The associations of actions and symbols along with the writer's identification form the records within the library.

As described above with respect to the method 200, actions may be identified, at 307, as predefined editing operations, comment operations, or custom and writer-supplied operations. Some examples of predefined editing operations include operations the delete handwritten text, insert handwritten text, and alter the color texture, effects, or font of handwritten text. Comment operations permit writer-supplied comments to be associated with the handwritten text. Custom or writer-supplied operations may include a variety of operations, such as exports to calendar applications, word processing applications, spreadsheet applications, database applications, and the like.

In some cases, at 308, a single action may be defined as a compound action that performs a series of actions. In these instances, a single action may be written as a script that processes a series of actions (two or more actions) such that by reference a link to the single compound action the script is invoked and processed and actually processes the series of actions defined therein.

At 309, the writer-defined or selected symbols, actions, and the writer's identification are recording within the library as a record or group of data. The record can be searched based on a gesture converted into normalized form and a specific writer's identification. The created library compliments the method 200 of FIG. 2, in that gestures recognized with portions of handwritten text may be normalized and searched in combination with a writer's identification to locate a substantial match of a record within the library. The record provides the actions performed by the method 200. Once the actions are performed, the resulting modified handwritten text may be supplied to an ICR engine and/or an OCR engine. Other administrative interfaces to the method 300 may permit writers to add, delete, or modify their records within the library. Moreover, the library can support a plurality of different writers, since the records are indexed based on writer identifications.

Figure 4:
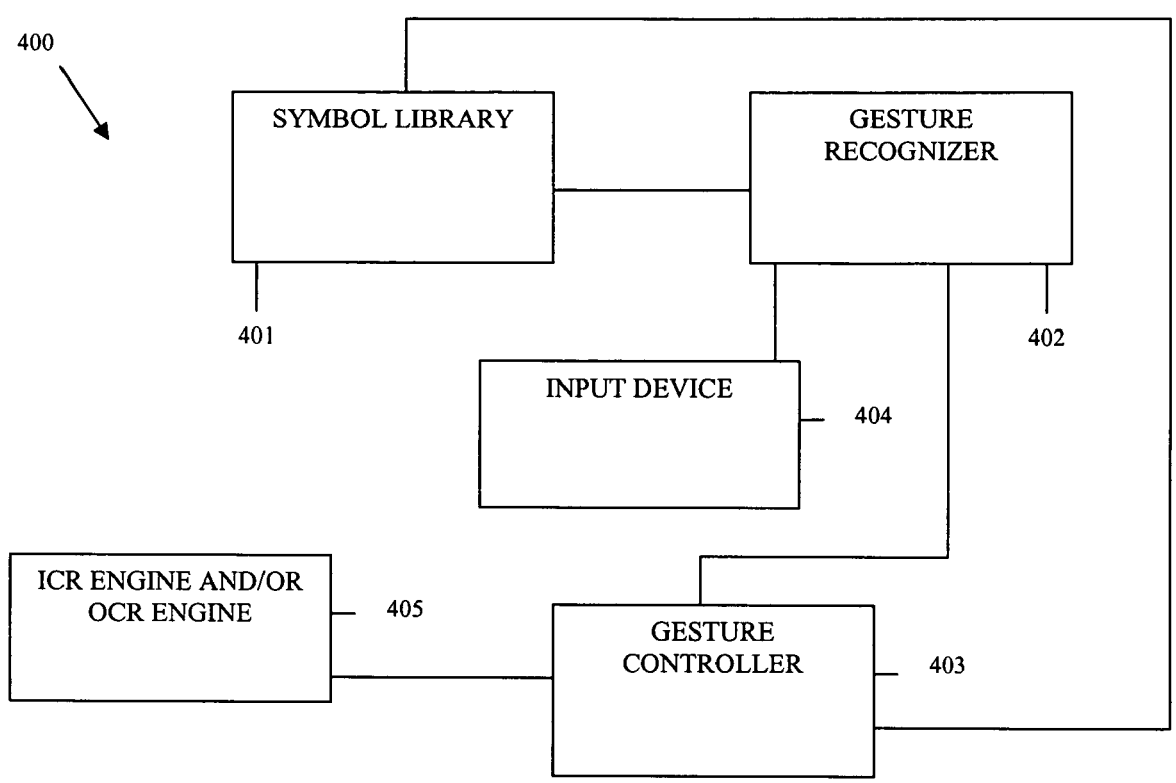
FIG. 4 is a diagram of a gesture recognition system, according to an example embodiment.

FIG. 4 is a diagram of one gesture recognition system 400, according to an example embodiment. The gesture recognition system 400 is implemented in a machine-accessible or readable medium. In one embodiment, the gesture recognition system 400 is wholly contained within a single processing device. In other embodiments, various components of the gesture recognition system 400 are remote or external from one another and interfaced over a network. Moreover, the gesture recognition system 400 implements, among other things, the processing of the methods 200 and 300 of FIGS. 2 and 3.

The gesture recognition system 400 minimally includes a symbol library 401, a gesture recognizer 402, and a gesture controller 403. In optional embodiments, the gesture recognition system 400 may also include an input device 404 and an ICR engine and/or OCR engine 405. In some embodiments, the symbol library 401 is located externally and accessible over a network to the remaining components of the gesture recognition system 400. In other embodiments, the symbol library 401 resides on removable media and is interfaced, accessed, and uploaded into a writer's processing device that includes the remaining components of the gesture recognition system 400. In yet other arrangements, the symbol library 401 resides locally within memory, storage, or directories of a processing device having the remaining components of the gesture recognition system 400.

The symbol library 401 includes interfaces to create, modify, and delete symbol records as described above with respect to method 300 of FIG. 3. Thus, writers populate the symbols and actions of the symbol records based on their respective writer identifications. This provides the environment for the rest of the gesture recognition system 400 during operation.

The gesture recognizer 402 recognizes gestures writers make over portions of handwritten text. These gestures are normalized into formats that are conducive to searching and are associated as metadata with the portions of handwritten text with which they overlay or are adjacent to.

In one embodiment, the gesture recognizer 402 is interfaced to an input device 404. The input device 404 may be controlled or manipulated by a writer vis-a-vis the handwritten text, such as when the input device 404 is a digital pen, digital stylus, and the like. Alternatively, the input device 404 may be positioned to capture the movements that a writer makes vis-a-vis the handwritten text in order to capture writer-supplied gestures, such as when the input device 404 is a digital camera or digital video. The gesture recognizer 402 recognizes the writer's gestures with respect to portions of the handwritten text and associates the gestures as metadata to be carried with those portions of the handwritten text.

The detected gestures are candidate symbols located in the symbol library 401. Either the gesture recognizer 402 or the gesture controller 403 normalizes the recognized gestures. Next, the gesture controller 403 searches the symbol library when invoked for a substantial match on a symbol for a specific writer identified by a writer's identification. The gesture controller 403 can be configured to be invoked based on pre-defined events, based on manual invocation initiated by a writer, or based upon a writer invocation of an ICR engine and or an OCR engine 405.

Once invoked the gesture controller 403, begins interacting with the gesture recognizer 402 to identify portions of the handwritten text having metadata (e.g., gestures). As the metadata is encountered, the gesture controller 403 acquires the normalized form of the metadata (either from the gesture recognizer 402 or by its own processing) and searches the symbol library 401 for a substantially matching symbol record. The symbol record includes references or links to one or more actions that the gesture controller 403 invokes against the associated portions of the handwritten text to which the recognized gesture (metadata) is associated. The actions process and alter the handwritten text in some manner (e.g., additions, deletions, text effects, etc.). Alternatively, the gesture controller 404 may be invoked manually by a writer or an operator or at a configurable point or upon the detection of an event. Thus, the gesture controller 403 may be invoked in a batch mode against previously recorded handwritten text.

Once the handwritten text is modified by the actions, the gesture controller 403 may optionally be configured to automatically invoke an ICR engine and/or OCR engine 405. Alternatively, the writer may select when and how to invoke any desired ICR engine and/or OCR engine 405. In some cases, the gesture controller 403 may be configured to interface with a version of the machine readable handwritten text after an ICR engine and/or OCR engine 405 processes the handwritten text. This may be advantageous or desired when some actions identified with some portions of the handwritten text process after a machine version of the handwritten text is produced, such as when an action calls for some characters to be exported to other applications (e.g., calendars, word processors, databases, spreadsheets, electronic mail, and the like).

In some instances, operations of the gesture controller 403 may be subsumed into the gesture recognizer 402 or vice-versa. For example, the gesture recognizer 402 may interface directly with the symbol library 401 to find substantial matches on symbol records for the recognized or detected gestures. In fact, the gesture controller 403 and gesture recognizer 402 may be combined into a single entity (not shown in FIG. 4). Correspondingly, the arrangement and architecture of FIG. 4 is presented for purposes of illustration only, since it is readily apparent that a variety of other configurations or other components may be added to or removed from the gesture recognition system 400 without departing from the teachings presented herein.

It should also be pointed out that the gesture recognizing system 400 is particularly well suited for input devices 404 associated with digital pens. The novel gesture recognition system 400 provides a straightforward, reliable, and cost-effective approach to recognizing gestures and processing associated actions.

Figure 5:
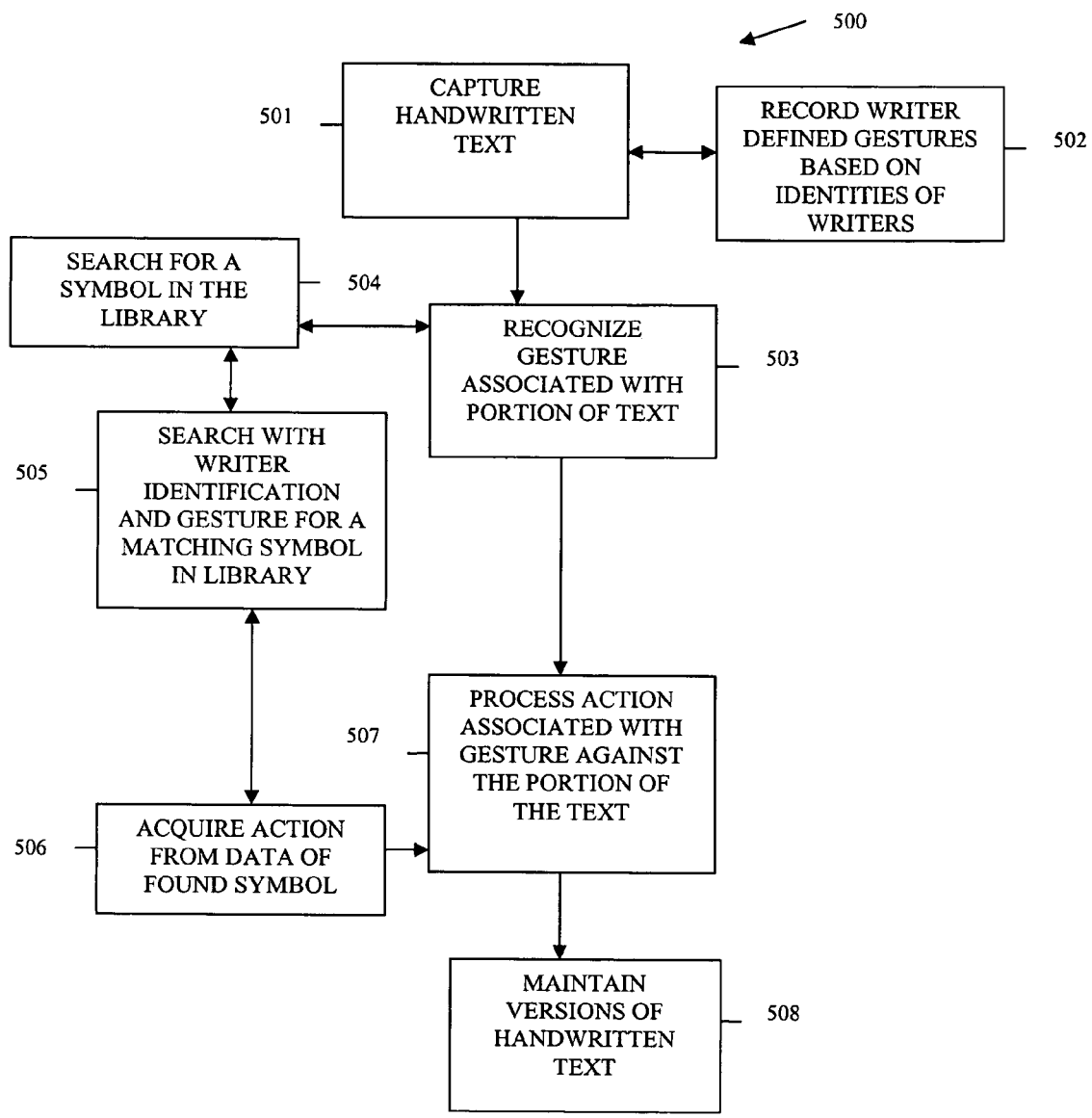
FIG. 5 is a diagram of another method for recognizing gestures, according to an example embodiment.

FIG. 5 is a diagram of another method 500 for recognizing gestures, according to an example embodiment. The method is implemented in a machine-accessible or readable medium. That medium may be a plurality of logically associated media or a single medium, such as removable media, memory, storage, or combinations of the same. Moreover, the medium may be accessed and downloaded over a network or uploaded from a removable medium, or combinations of the same. The medium when accessed to one or more processing devices executes the method 500 of FIG. 5.

At 501, handwritten text is captured from a writer. That handwritten text is in an imaged format and may be captured from a variety of input devices, such as digital pens, digital styluses, digital camera, digital videos, etc. In one embodiment, the handwritten text is time stamped or otherwise uniquely identified and labeled when captured and this metadata is carried with the handwritten text and permits the method 500 to distinguish and separate between writer-supplied edits (identified as gestures (candidate symbols)) and the original handwritten text.

In some embodiments, at 502, a writer may define and record his/her own writer-defined gestures prior to or during an iteration of the method 500. These writer-defined gestures are identified as symbols within a symbol library, such as symbol library 401 of FIG. 4 and may be populated in the manners described above with the processing of the method 300 of FIG. 3.

After the handwritten text is captured in image form, the writer begins to edit the handwritten text image using an input device interfaced to the method 500. Accordingly, at 503, the writer manipulates the input device or is in view of the input device (such as when the input device is a digital camera or video) and begins making gestures directly over or in close proximity to various portions of the handwritten text image.

The gestures are recognized as candidate symbols, which were previously defined (in some instances writer specific and writer defined). These gestures become symbols that can be searched once they are normalized (e.g., given scores or represented in mathematical form (such as a series of image features)). In some embodiments, at 504, the normalized forms of the gestures are used to query a library (e.g., database, data store, file, directory, etc.) to obtain a substantial match on a previously writer-defined symbol. The search may be based on the normalized forms of the recognized gestures and a writer's identification, as depicted at 505. The resulting match includes a record of data having additional data, such as one or more actions associated with a matched symbol from the library, as depicted at 506.

At 507, an action is processed against portions of the handwritten text associated with a matched symbol. Again, actions may be compound (e.g., a script that processes two or more actions, etc.) and may be associated with altering the substance or appearance of handwritten text to which the actions are associated. In some cases, the actions are delayed until the handwritten text is translated from image form into machine-readable form (achieved by applying an ICR engine and/or OCR engine). For example, some writer-defined actions may request that certain portions of the handwritten text be exported to another application after the handwritten text is in machine-readable form, such as for purposes of exporting data to a calendaring system, spreadsheet, etc.

In one embodiment, at 508, the method 500 may also maintain versions of the handwritten text. That is, a writer may be able to revert back to previous version of the handwritten text by accessing options associated with interfaces of the method 500. To achieve this, the entire imaged data associated with the handwritten text does not have to be maintained in memory or storage by the method 500, since one of ordinary skill in the art recognizes that version control may be achieved by maintaining metadata that identifies changes which have taken place from the original version of the handwritten text to other subsequent versions of the handwritten text. In this manner, when a particular version is desired, the method inspects the appropriate metadata and applies the changes to the original version of the handwritten text to acquire the desired version.

In some embodiments, multiple gestures over a single portion of the handwritten text may be recognized. Thus, a writer may make multiple edits over the same portion of the handwritten text. This can be achieved by time stamping each writer gesture and since the gestures are metadata, the processing of the method 500 can distinguish between each of the individual gestures made over a same portion of the handwritten text. Multiple gestures may be complimentary to one another meaning that applying one does not contradict applying another. Conversely, gestures may be contradictory meaning that applying one may contradict actions taking by another. Precedence for handling contradictory gestures may be pre-defined (such as applying the last recorded gesture based on time stamps) or may be writer-defined based on writer-supplied policies.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject mater lies in less than all features of a single disclosed embodiment. Thus the following claims are hereby incorporated into the Description of the Embodiments, with each claim standing on its own as a separate exemplary embodiment.

The invention claimed is:

1. A method comprising:
   recognizing a plurality of gestures related to portions of previously recorded handwritten text supplied by a user at a first time, wherein the gestures and the handwritten text are maintained separately from one another and the gestures maintained as metadata for the portions of the handwritten text to which it relates and the gestures supplied at a second time; and
   performing, in a batch fashion, actions associated with the gestures against the portions of the handwritten text.

2. The method of claim 1 further comprising, performing intelligent character recognition against at least one of the portions of the handwritten text and remaining portions of the handwritten text.

3. The method of claim 1, wherein recognizing further includes capturing the gestures with a digital pen.

4. The method of claim 1, wherein recognizing further includes identifying the gestures from a library of configurable symbols associated with a writer.

5. The method of claim 1, wherein performing further includes performing at least one of:
   deleting the portions of the handwritten text;
   altering the appearance of the portions of the handwritten text;
   altering font characteristics of the portions of the handwritten text;
   altering color or texture characteristics of the portions of the handwritten text; inserting other handwritten text before or after the portions of the handwritten text;
   associating a comment with the portions of the handwritten text; and
   processing a custom application against the portions of the handwritten text.

6. The method of claim 1, wherein recognizing further includes capturing the portions of the handwritten text before recognizing gestures, and wherein the gestures can overlap some of the portions of the handwritten text.

7. A method comprising:
   identifying a writer by a writer identification once a writer has logged in;
   receiving one or more symbols from the writer;

receiving one or more actions from the writer for each of the one or more symbols; and recording the one or more symbols and the one or more actions in a library associated with the writer identification, and wherein the library includes other symbols associated with other writers and selection of proper symbols is made based on a specific writer identification, and wherein symbols from different writers can be used in connection with a piece of handwritten text to identify the actions to take against that handwritten text.

8. The method of claim 7 further comprising, accessing the library from a remote device which is external to a device that is processing the method.

9. The method of claim 7 further comprising, accessing the library within a device that is processing the method.

10. The method of claim 7, wherein receiving the one or more symbols further include receiving input identifying a gesture for each of the one or more symbols from an input device controlled by the writer.

11. The method of claim 7, wherein receiving the one or more actions further include identifying the one or more actions as at least one of instructions to alter the appearance of handwritten text, instructions to delete or insert the handwritten text, instructions to process custom applications against the handwritten text, and instructions to add comments to the handwritten text.

12. The method of claim 7, wherein receiving the one or more actions further include receiving selections from a list of available actions from the writer.

13. The method of claim 7, wherein receiving the one or more actions further include receiving at least one of the one or more actions as a compound action that includes a plurality of the one or more actions.

14. A system, comprising:
a symbol library;
a gesture recognizer; and
a gesture controller, wherein the gesture recognizer, in a batch fashion, detects gestures of a writer and locates the gestures in the symbol library for that writer to acquire actions, the gesture controller processes the actions against previously recorded handwritten text associated with the detected gestures, and wherein the gestures are maintained separately from the handwritten text and carried as metadata associated with the handwritten text.

15. The system of claim 14 further comprising, an input device interfaced to the gesture recognizer, wherein the input device includes at least one of a digital pen, a digital stylus, and a digital camera.

16. The system of claim 14 further comprising, at least one of an Intelligent Character Recognition (ICR) engine and an Optical Character Recognition (OCR) engine that translates the handwritten text into machine readable characters after the gesture controller processes the actions against the handwritten text.

17. The system of claim 14, wherein at least some portions of the gestures overlay portions of the handwritten text.

18. The system of claim 14, wherein at least some portions of the gestures are adjacent to or surround portions of the handwritten text.

19. The system of claim 14, wherein the symbol library includes writer-defined symbols that correspond to the gestures based on identities of writers.

20. A computer-readable medium encoded with computer executable instructions for recognizing gestures, the instructions when executed performing the method comprising:

capturing handwriting text at a first time;

recognizing a plurality of gestures in a batch fashion and associated with a second time and that are associated with portions of the handwritten text, and wherein the gestures are maintained separately from the handwritten text as metadata for the handwritten text; and processing actions in a batch fashion, wherein the actions are associated with the gestures and processed against the portions of the handwritten text.

21. The medium of claim 20, wherein recognizing further includes instructions for searching symbols that substantially matches the gestures.

22. The medium of claim 21, wherein recognizing further includes instructions for acquiring the actions from data associated with the symbols in the symbol library.

23. The medium of claim 21, wherein searching further includes instructions for searching the symbol library with a writer's identification and the gestures.

24. The medium of claim 20, further including instructions for recoding writer-defined gestures based on identities of writers.

25. The medium of claim 20, further including instructions for maintaining versions for the handwritten text, wherein one version is maintained before processing the actions and another version is maintained after processing the actions.

26. The medium of claim 25, wherein maintaining further includes maintaining additional metadata that permits each of the versions to be reproduced, wherein the additional metadata identifies changes that need to be applied or undone to an existing state of the handwritten text.

* * * * *